(12) United States Patent
Grace

(10) Patent No.: US 8,281,936 B2
(45) Date of Patent: Oct. 9, 2012

(54) VACUUM WASHER DRUM HAVING A CENTER AND END DRAINS AND METHOD FOR DRAINING

(75) Inventor: Todd S. Grace, Alpharetta, GA (US)

(73) Assignee: Andritz Inc., Glens Falls, NY (US)

( * ) Notice: Subject to any disclaimer, the term of this patent is extended or adjusted under 35 U.S.C. 154(b) by 1502 days.

(21) Appl. No.: 11/617,273

(22) Filed: Dec. 28, 2006

(65) Prior Publication Data

US 2008/0156747 A1 Jul. 3, 2008

(51) Int. Cl.
*B01D 00/44* (2006.01)
*B01D 00/67* (2006.01)
*B01D 00/73* (2006.01)

(52) U.S. Cl. ........ 210/402; 210/404; 210/406; 210/784; 210/808

(58) Field of Classification Search .................. None
See application file for complete search history.

(56) References Cited

U.S. PATENT DOCUMENTS

| | | | | |
|---|---|---|---|---|
| 1,223,245 A * | 4/1917 | Biesel | .......................... | 210/395 |
| 5,021,126 A | 6/1991 | Gwin et al. | | |
| 6,006,554 A | 12/1999 | Gallagher | | |
| 2006/0065378 A1 | 3/2006 | Grace | | |
| 2008/0156747 A1* | 7/2008 | Grace | .......................... | 210/808 |

OTHER PUBLICATIONS

IMPCO Coru-Dek™ Vacuum Washers, Beloit Corporation, 7 pages, 1996.*
"IMPCO Coru-Dek IV Vacuum Washer", GL&V, 2001, 2 pages.
Andritz Pulp Mills Services, "Vacuum Washers" (5 pages)(shows vacuum washers)(published prior to Dec. 2006).

* cited by examiner

*Primary Examiner* — Robert James Popovics
(74) *Attorney, Agent, or Firm* — Nixon & Vanderhye P.C.

(57) ABSTRACT

A vacuum drum washer including: a cylindrical drum including a screen and deck defining an exterior cylindrical surface; a plurality of outer filtrate channels disposed inward of the screen, the outer filtrate channels extending along a longitudinal axis of the drum and substantially an entire length of the drum; an radial array of filtrate end conduits extending radially inward from the outer filtrate channels towards a rotational axis of the drum, the radial filtrate conduits have an inlet positioned at a first end of the drum and draining filtrate from the outer filtrate channels; a filtrate chamber at the first end of the drum and receiving filtrate discharged from the end conduits, and an array of radial filtrate drainage conduits coupled to receive filtrate from the filtrate channels, the drainage conduits each having an inlet proximate to the filtrate channels, the inlets are arranged between a center of the drum and a second end of the drum, and the radial drainage conduits directing filtrate to the filtrate chamber.

15 Claims, 5 Drawing Sheets

VACUUM WASHER DRUM HAVING A CENTER AND END DRAINS AND METHOD FOR DRAINING

BACKGROUND OF THE INVENTION

The field of the invention is rotary drum vacuum washers, e.g., filters, used in the pulp and papermaking industry to form a mat of wood pulp and cleanse the mat of filtrate. In particular, the invention relates to the filtrate drainage systems for vacuum drum washers.

Vacuum washer drums remove pulping liquors and other liquids from pulp. A vacuum washer has a large rotating cylindrical drum that sits partially in a vat of pulp and liquor. The following references the drum as it rotates in a clockwise direction. As the drum surface rotates through the vat, e.g., 3:00 to 9:00 drum positions, a pulp mat forms on the wire screen surface of the drum. The screen prevents pulp from flowing into drainage passages in the drum. A suction is applied to the drum surface through the drainage passages. The suction pulls the liquor through the wire screen on the drum surface and causes a pulp mat to form on the surface. The suction draws the wash liquid through the mat and into the drainage passages. As the drum surface with pulp mat rotates up and out of the vat from the 9:00 to 12:00 position, water is sprayed on the pulp mat to remove cooking liquor from the pulp. The water and liquor (but not pulp fibers) pass through the wire screen and flow into the drainage passages. The water and liquor in the drainage passages is referred to as "filtrate". The washed pulp mat is removed from the drum surface, at about the 2:00 to 3:00 drum position, before the drum surface rotates down into the vat. The drum surface rotates back into the vat to pickup another pulp mat.

The drainage passages are internal to the drum and typically include channels immediately behind the wire screen surface and deck extending along the entire length of the cylindrical wire screen surface. The channels conventionally drain into radial passages at the end of the drum ("end draining drum") or into a conical array of drain tubes extending from a center annular drain behind the wire screen and deck ("annular center draining drum"). The drain tubes of the annular center draining drums extend from the drum surface at the center of the drum to an end of the drum. The conical array of drainage tubes discharge through an annular disc tube sheet at an end of the drum and into a V-trunnion that caps the tube sheet. The tube sheet and V-trunnion have relatively large diameters, e.g., 50 inches to 60 inches (127 cm to 152 cm), to accommodate a large number of drainage tubes, e.g., 30 to 36 tubes, that each have a relatively large diameter of, for example, 6 inches (15 cm).

The radial end drain tends to be inexpensive to manufacture and maintain, as compared to the center draining drum. The radial end drain has difficulty in draining filtrate from the far end of long drums, such as where the drum length exceeds 20 feet (6 meters). The annular center drain is typically used for longer drums, e.g., longer than 20 feet (6 meters), but is expensive to manufacture and maintain. The annular center drain is expensive, in part, because the V-trunnion is a large device having intricate drain passages that direct filtrate from each of the tubes to an axial drain. There is a long felt need for a less expensive filtrate drainage system for vacuum washers having long drums.

BRIEF SUMMARY OF THE INVENTION

A novel drainage system for a vacuum drum washer has been developed that includes an end-draining drum and a reduced size annular drain that is offset from center towards a far end of the drum. The reduced sized annular drain has relatively small diameter drain tubes that discharge through a small diameter tube sheet. A V-trunnion is unnecessary because the small tube sheet is suitable to operate with a cylindrical trunnion. As the radial passages and drain tubes rotate through the radial position where substantially no filtrate flows, e.g., 1:00 to 5:00 positions, a novel valve seal blocks suction for both the radial end drain passages and drain tubes that is typically used with end-draining drums. The novel drainage system is suitable for drums having a length greater than 20 feet (6 meters).

BRIEF DESCRIPTION OF THE DRAWINGS

An embodiment of the vacuum drum washer is described in detail with reference to the accompanying drawings which include.

DETAILED DESCRIPTION OF THE INVENTION

Figure 1:
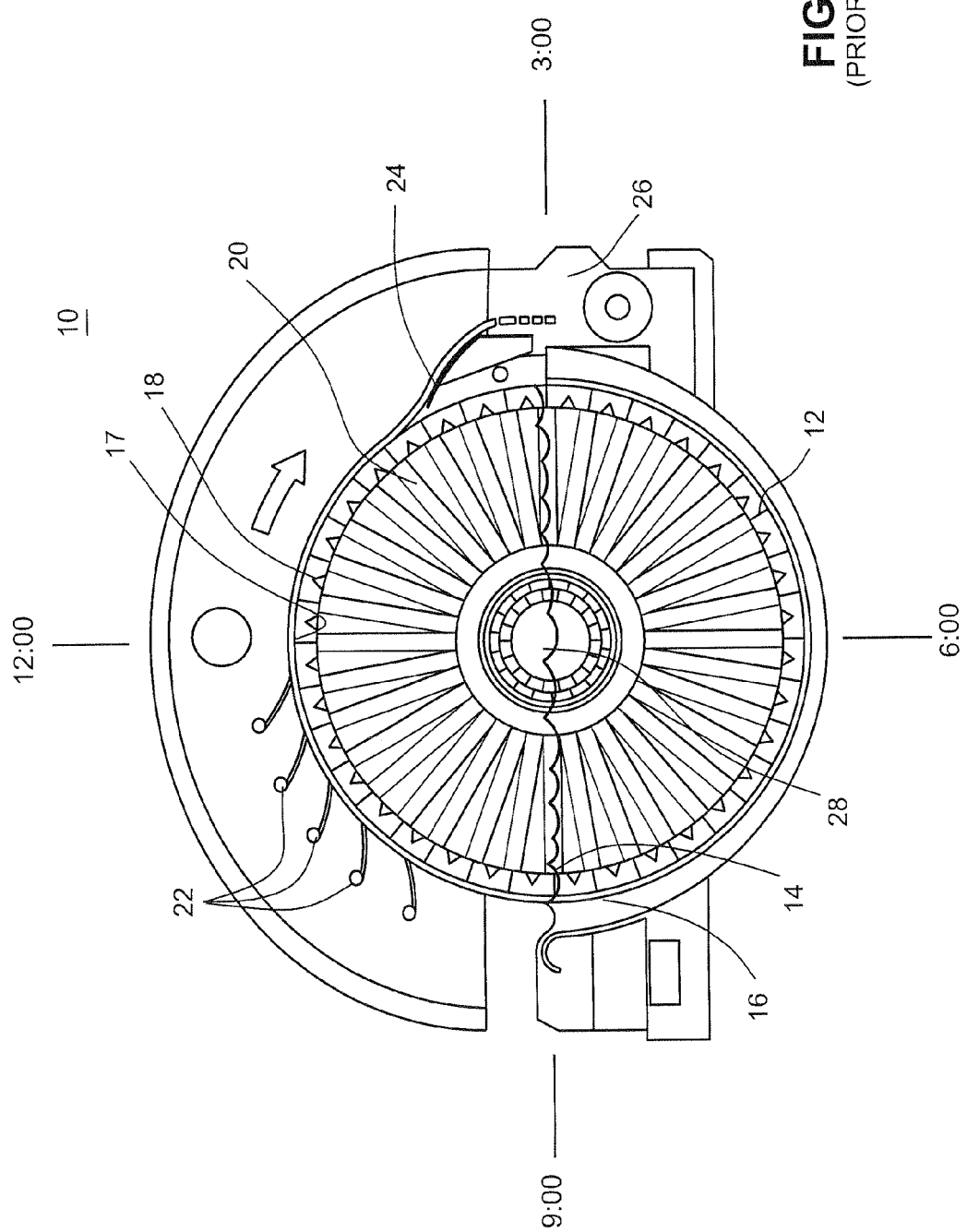
FIG. 1 is a cross-sectional end view of a conventional vacuum drum washer assembly.

FIG. 1 shows a conventional end-drain rotary drum vacuum filter 10 that includes a rotary drum 12 in a vat 14 of pulp slurry. The drum is partially submerged in a pulp slurry vat vessel, such as up to the horizontal centerline of the drum. As the outer drum surface rotates clockwise through the slurry (3:00 to 9:00 positions), a pulp mat 16 forms on the outer face 17 of the drum. To promote mat formation, suction is applied to the drum porous outer surface 17, e.g. a screened and wire or corrugated deck surface. The porosity of the screen surface 17 is sufficiently fine to retain fibers on the surface and pass primarily filtrate, e.g., cooking liquor and water, into the channels 18 behind the porous surface. The channels 18 are arranged in a longitudinal array behind the screen and extend the length of the drum. The channels drain into radial channels 20 at one end of the drum or, alternately, tubes extending from a center annular drain. The radial channels or tubes lead to a central filtrate chamber 28. As the surface 17 of the drum travels up and out of the vat (corresponding to the 9:00 to 12:00 rotational positions of the drum), the pulp mat 16 on the surface is washed with a liquid spray 22, e.g., wash water, that cleans the pulp mat of chemical pulping liquor. Suction draws the water and liquor from the pulp mat into the channels 18 behind the drum surface 17. The channels drain to the radial end channels 20 which drain into a filtrate chamber 28 that is typically at one end of the drum and coaxial to the drum. As the drum surface passes over the top rotational position (12:00 to 1:00), the wash water spray is stopped. As the drum rotates towards the 2:00 position, the suction stops, but water continues to drain through the pulp and into the channels and radial drain passages. Air also starts to enter the channels and ribs because of the stoppage of wash water.

The concentrated pulp is generally referred to as a pulp cake. As the drum rotates through to the 2:00 to 3:00 position, a scraper 24 removes the pulp mat from the drum surface. The pulp cake is collected in a chamber 26 for further processing. Vacuum washers typically receive a low consistency pulp slurry (1.0-1.5% pulp by weight) in the vat vessel. The pulp is thickened on the drum surface as the drum surface rises out of the vat to about a 10% consistency. The pulp is further thickened to a discharge consistency from the drum of 12% or greater. After the cake is removed, the drain channels 18 and ribs (e.g., radial drain passages) are typically filled with air. As the drum surface (now scraped clean of the pulp mat) rotates past the 3:00 position, the surface renters the vat 14. Suction is reapplied to the channels and ribs after the surface is submerged into the vat. A pulp mat 16 begins to form again on the drum surface 17. The formation of a pulp mat, water cleaning of the mat, and scraping of the map off the drum is a continuous process that occurs as the drum rotates.

The motive force for the suction on the drum surface is a vacuum created in the drain passages as the extracted filtrate drops approximately 30 feet (ft.) to 40 ft. (10 to 13 meters) from the rotary drum vacuum washer 10 to a filtrate tank (below the washer). The pipe through which the filtrate passes is known as a drop leg 32 (FIG. 2).

Figure 2:
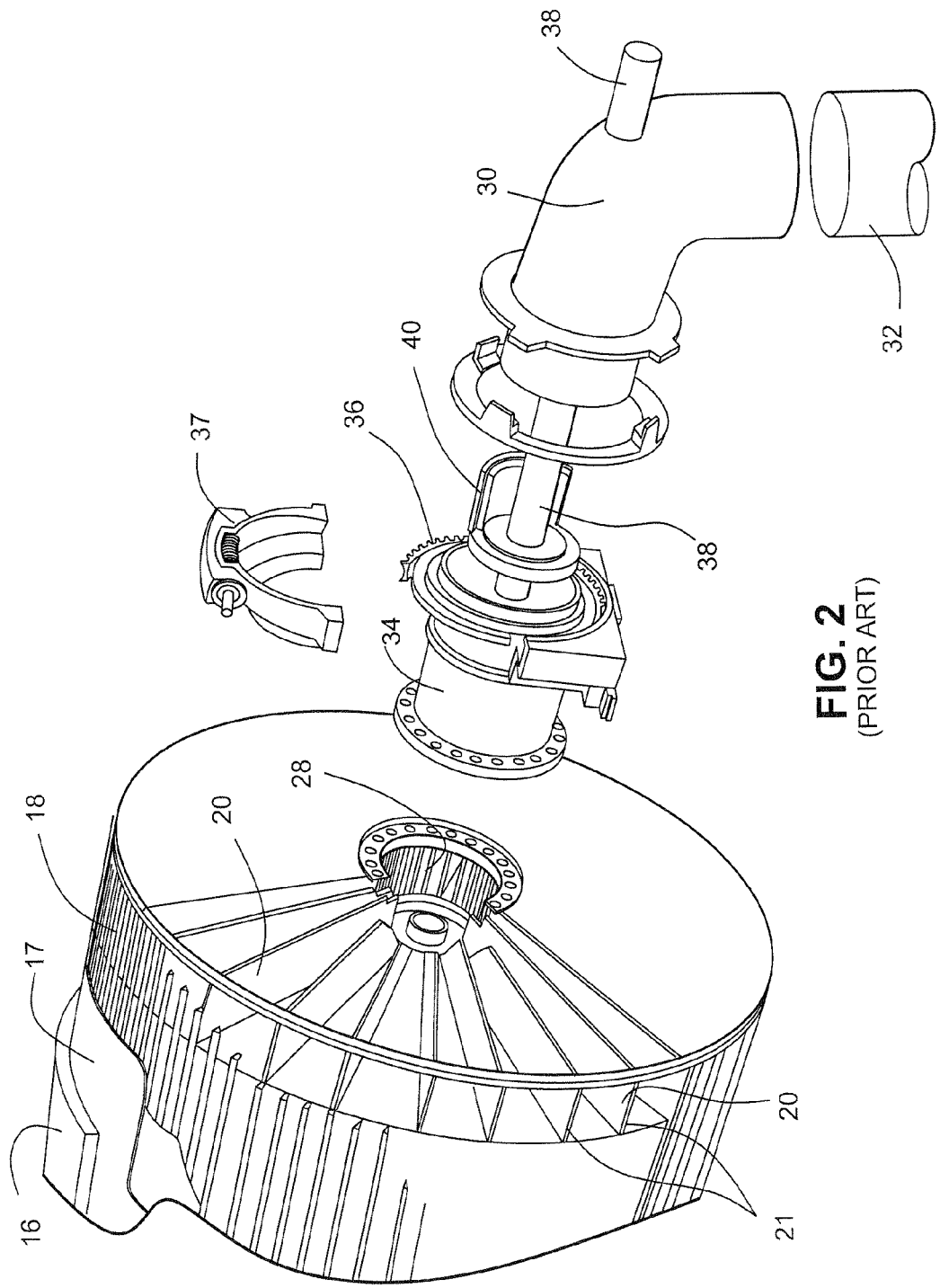
FIG. 2 is perspective view of a conventional end-draining vacuum washer drum.

FIG. 2 shows an exemplary prior art end drain vacuum drum 19. The radial end drain channels 20, e.g., ribs, are each separated by channel walls 21. The filtrate chamber 28 in the drum 12 is coupled to a cylindrical trunnion conduit 34 that rotates with the drum. The trunnion conduit 34 is typically driven through a worm gear 36 and a matching drive worm gear collar 37 to rotate the drum. The elbow 30 and down leg 32 conduits are stationary. An inlet end of the elbow is coupled to the outlet of the rotating trunnion conduit. FIG. 2 is an exploded view of the trunnion conduit and elbow and down leg. In practice, the outlet of the trunnion conduit is rotatably coupled to the inlet to the elbow conduit 30 and the elbow and down leg 32 conduits are connected.

The center shaft supports a valve seal 40 that includes a generally arc shaped section that extends from about the 1:00 position to the 5:00 position relative to the rotation of the drum. The outer face of the valve seal is positioned in the filtrate chamber 28 and juxtaposed against the drainage outlets for the ribs 20 (as the ribs pass through the 1:00 position to the 5:00 position). The drainage outlets of the ribs open to the filtrate chamber 28.

A center shaft 38 extends from the elbow into the trunnion conduit 34. The center shaft is of a relatively small diameter as compared to the inner diameter of the filtrate passage in the elbow and down leg. The center shaft 38 is hollow to allow gases in the filtrate to vent into an aperture in the valve seal 40 and into the shaft and avoid entering the filtrate passage in the elbow 30 and down leg 32.

The valve seal 40 blocks the outlets of the ribs 20 in the drum as the ribs rotate through the 1:00 to 5:00 positions. The arc width of a conventional valve seal is typically about 120 degrees which corresponds to rotating the drum through the 1:00 to 5:00 positions. The ribs are prevented by the valve seal from draining to the filtrate chamber 28 and into the trunnion conduit. As the ribs rotate from 1:00 to 5:00, filtrate and gases, e.g., air, in the ribs are intended to remain in the ribs. The valve seal 40 prevents most of the gases in the ribs from flowing into the filtrate chamber 28 and to the trunnion conduit 34, elbow conduit 30 and down leg conduit 32.

The valve seal 40 also prevents suction from being applied to the ribs as the ribs pass from the 1:00 to 5:00 positions. Suction is neither needed nor desired as the surface 17 of the drum passes from the 1:00 to 5:00 positions because gravity holds the pulp mat 16 on the surface until the scraper 24 (FIG. 1) removes the pulp cake 16 at about the 2:00 to 3:00 position. Suction if applied from the 1:00 to 5:00 positions would draw air into the channels and ribs and impede removal of the pulp mat.

The valve seal 40 does not block the application of suction to the ribs or the drainage of filtrate from the ribs as the ribs rotate clockwise from the 5:00 position to the 1:00 position. As the ribs move through the vat, suction (applied through the ribs by the down leg) draws a pulp slurry onto the drum face screen and pulls filtrate through the screen and into the channels, ribs and to the filtrate chamber 28. Similarly, as the ribs move up out of the vat to the top drum position (3:00 to 12:00), the suction draws filtrate, including the wash water, through the screen and into the channels, ribs and filtrate chamber. The flow of filtrate into the ribs moving from the 5:00 position to the 1:00 position is sufficient to create a substantial suction as the filtrate flows into the elbow conduit 30 and down leg conduit 32. Substantial amounts of air are prevented from entering the elbow and down leg because the channels and ribs are substantially filled with liquid filtrate as the channels are submerged in the vat and pass under the water spray, which occurs as the drum moves from the 5:00 position to the 1:00 position. After the channels rotate past the water spray (at about the 12:00 to 1:00 position), the outlets to the ribs are blocked by the valve seal to prevent gas from entering the filtrate chamber and trunnion conduit.

Figure 3:
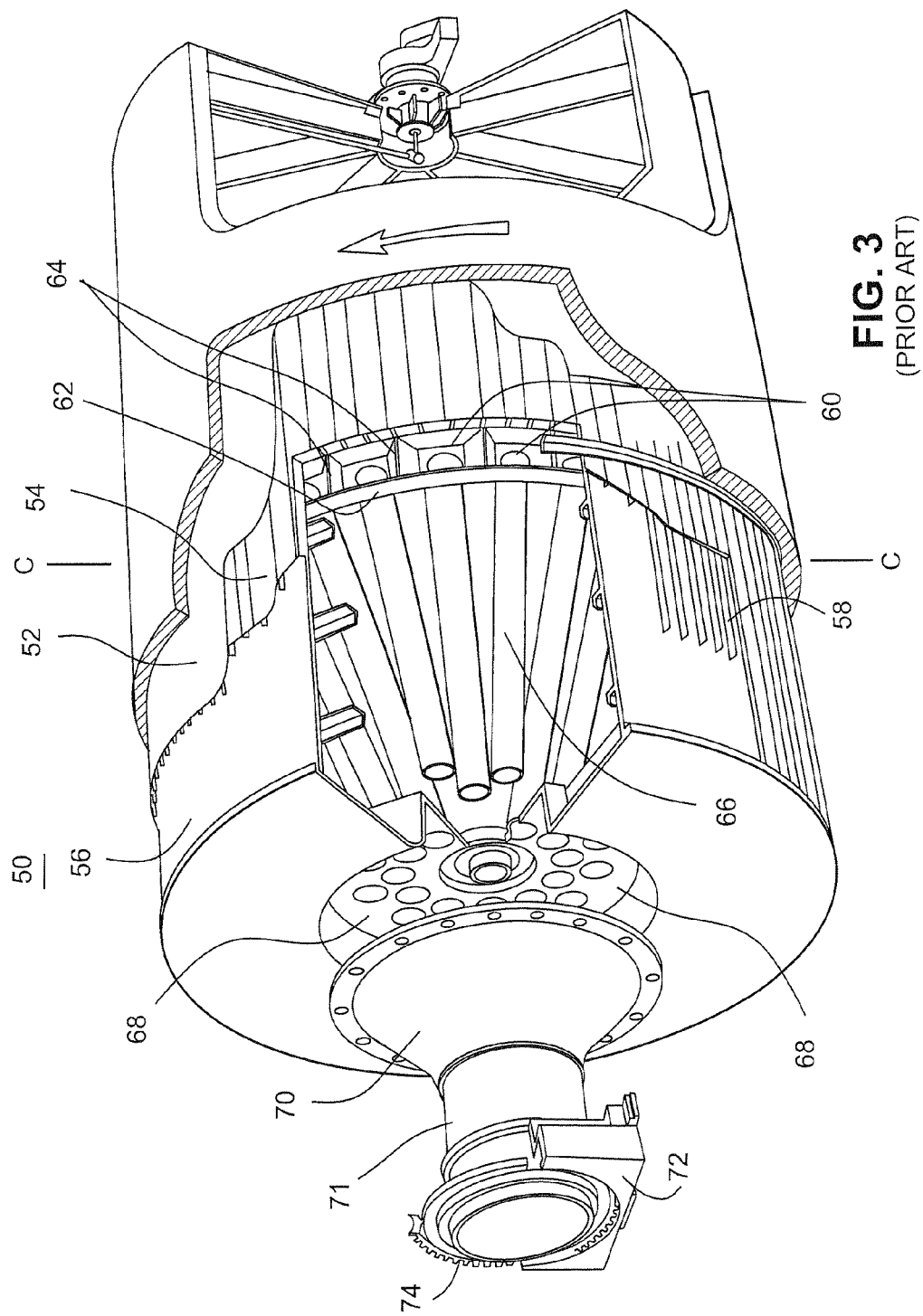
FIG. 3 is a perspective view of a conventional center draining vacuum washer drum.

FIG. 3 is a perspective view of the end and side of a conventional center drain vacuum drum washer 50. The drum includes a pulp mat 16 [not labeled], a porous cylindrical surface 52, a deck 54 supporting the surface 52, a cylindrical drum support surface 56 and longitudinal channel bars 58 supported by the support surface 56 and in turn supporting the deck 54. The longitudinal filtrate channels 18 are defined by the channel bars 58 and are formed between the deck 54 and the support surface 56. At the longitudinal center (C) of the drum is an annular center drain 60 which includes an annular channel beam 62 attached to the support surface 56. The support surface has an annular opening for the channel beam. The channel beam has an open face that receives filtrate from the filtrate channels 18. The channel beam 62 is segmented by dams 64. Each segment of the channel beam drains into a drain tube 66. The drain tubes are typically about 6 inches (15 cm) in diameter. The drain tubes 66 are arranged in a conical array that extends from the channel beam 62 to an annular tube sheet 68 at one end of the drum.

The tube sheet 68 has openings for each of the drain tubes. A conventional tube sheet 68 is typically 50 to 60 inches (127 cm to 152 cm) in diameter. The large diameter of the tube sheet 68 is necessary to accommodate the ends of the drain tubes 66. The tube sheet must have sufficient surface area to provide an outlet to each of the drain tubes. The tube sheet has an opening for each of the drain tubes. The large number of drain tubes and their relatively large diameter, e.g., 6 inches, cause the tube sheet to have a relatively large diameter.

Because of the large diameter of the tube sheet, a V-trunnion is conventionally used in center drain drums rather than the cylindrical trunnion used in radial drain drums. The V-trunnion 70 covers the tube sheet and provides a corresponding filtrate passages for each of the outlets in the tube sheet for the drain tubes. The filtrate passages in the V-trunnion each have an inlet corresponding to an outlet on the tube sheet. To correspond to the outlets on the tube sheet, the inlet diameter of the V-trunnion must be as large as the diameter of the tube sheet. Because of its relatively large inlet diameter, and the need for internal passages corresponding to each drain tube, conventional V-trunnions are expensive to manufacture and maintain. The filtrate passages in the V-trunnion conduct the filtrate flow from each drain tube towards an internal filtrate chamber and to an outlet 71 of the V-trunnion. A stationary conical valve seal is arranged in the V-trunnion to block outlets of the filtrate passages in the V-trunnion as those passages move from the 1:00 to 5:00 positions.

The V-trunnion 70 is mounted to the end of the drum, is coaxial to the drum and covers tube sheet 68. The V-trunnion rotates with the drum and is mounted on a bearing 72. A worm gear 74 on the outlet to the trunnion coupled to a drive motor (not shown) to turn the vacuum drum washer 50.

Figure 4:
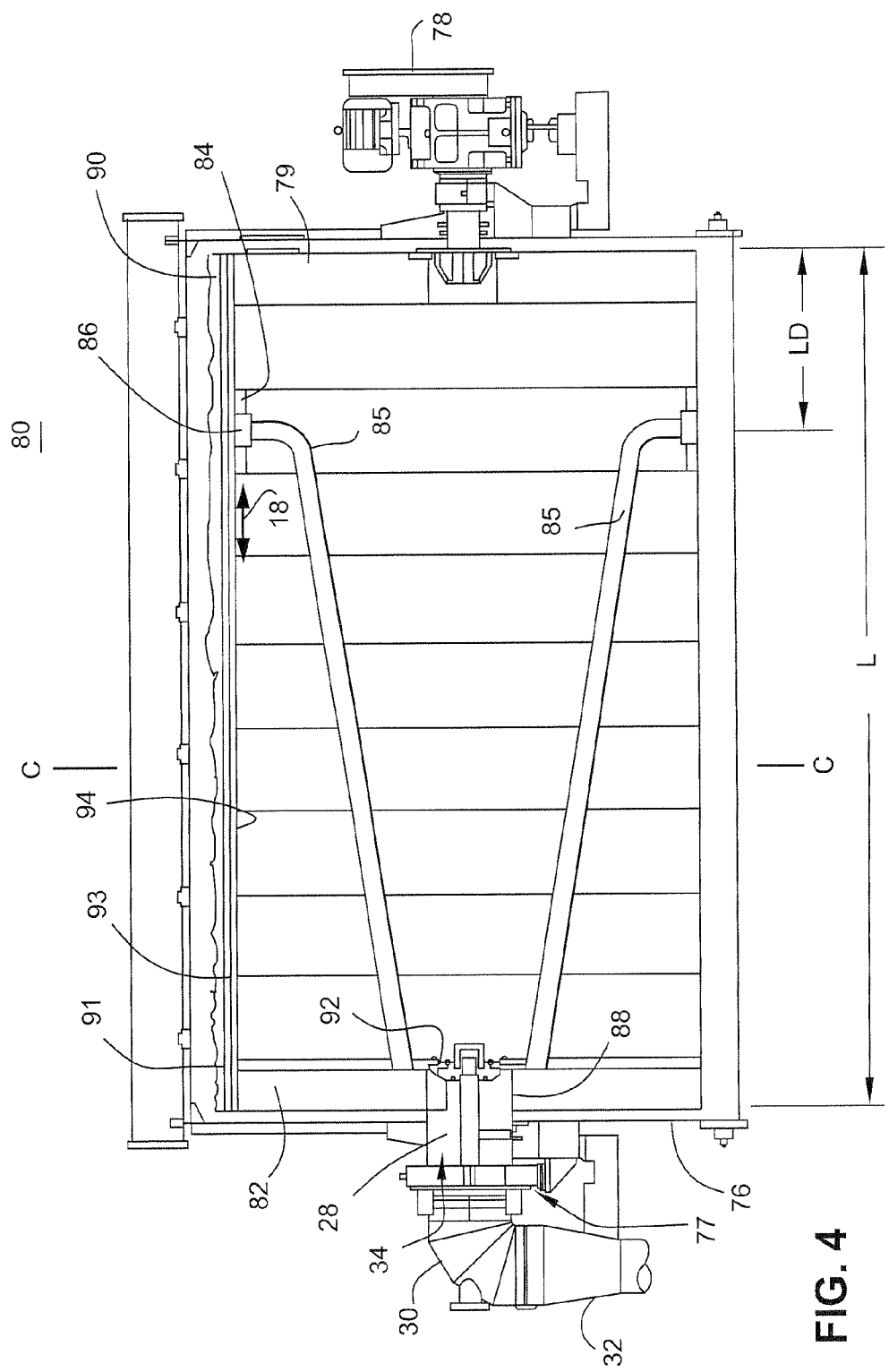
FIG. 4 is a cross-sectional side view of a vacuum washer drum having an end drain and an annular drain offset from the center of the drum.

FIG. 4 is a cross-sectional diagram of a novel vacuum washer drum 80 for washing and concentrating pulp. The drum includes an end drain 82 and an annular drain 84. Drain tubes 85 are arranged in a conical array in the interior of the drum and extend from the annular drain 86 to a filtrate chamber 28. The annular drain is offset from the longitudinal center (C) towards an end 79 of the drum opposite to the radial drain 82. The annular drain 90 for the drain tubes 85 may be offset form center (C) such that it is in the last one third or one fifth of the drum length. For example, if the length (L) of the drum is between 22 feet to 32 feet (7.7 meters to 9.8 meters), the distance between the annular drain 84 and the end 86 of the drum may be 4 feet to 12 feet (1.2 meters to 3.7 meters).

The drum 80 is generally conventional except for its combined end drain 82 and annular 86 drain with drain tubes 85, a small diameter tube sheet, and a novel valve seat. As does the drum shown in FIG. 3, the drum 80 picks up a pulp mat 90 as it rotates through a vat and the mat is sprayed with water and the mat is removed as the drum rotates through the 3:00 position and down into the vat. The drum includes a porous cylindrical screening surface 92, that may include a cylindrical wire screen or deck, and channel bars 93 supported by a cylindrical support surface 94. The screening surface 92 is supported by the channel bars. Filtrate flows through the filtrate channels 18 between the channel bars 93 and in the annular gap between the screening surface 92 and the support surface 94.

The drain end 76 of the drum 80 includes the end drain 82, a filtrate chamber 28 coaxial to the rotation axis of the drum, a cylindrical trunnion conduit 34, a trunnion bearing unit 77, an elbow joint 30 and a drop leg 32 that extends down, e.g., 30 to 40 ft (10-13 meters) to a sealed filtrate collection chamber. The trunnion bearing unit may include a worm and bull gear that are coupled to a motor that turns the drum. Alternatively, an electric motor and drive gear unit 78 may be attached to the opposite end 79 of the drum to turn the drum. Generally, the drive unit 78 is on just one end of the drum.

The annular drain 86 may include an annular channel attached to the cylindrical support surface 94. The annular drain 86 may be similar in structure (but not position) to the annular center drain shown in FIG. 3. The inner support surface 94 has an annular slot opening for the channel beam 84 such that filtrate flowing along the longitudinal channels 18 flows into the annular filtrate drain 86. The channel beam has an open face that receives filtrate from the filtrate channels 18. The upper rim of the filtrate drain 86 is at or below the inner support solid surface 94 for the filtrate channels 18. The annular filtrate drains include dams (see 64 of FIG. 3). The dams block filtrate from flowing annularly around the channel of the filtrate drain and seeping out through the pulp mat and back into the vat (rather than into the drain tubes). Each segment of the channel beam between opposite dams has a drain 86 coupled to a corresponding drain tube 85.

The longitudinal channels direct filtrate along the length of the drum to either the end drain ribs 82 or the annular drain 86. Other than longitudinal channel bars, flow guides may not be needed in the longitudinal channels to direct filtrate to the end drain or to the annular drain. The filtrate should naturally flow to the end ribs and annular drain that offers the least resistance to the filtrate in the longitudinal channels 18. Presumably, most of the filtrate flows towards the ribs at the end of the drum. The filtrate near the opposite end of the drum will flow to the annular drain 86.

The lateral distance (LD) between the far end of the drum and the annular drain 86 can be selected such that the volume of filtrate expected to flow into the drain 86 can be accommodated by the small diameter drain tubes 85. Further, the total cross-sectional area of all of the drain tubes can be divided by the total volume of filtrate that passes through the drum in a single revolution. The resulting fraction, which should be less than one half, can be used to estimate the distance from the far end of the drum at which the annular drain 96 should be positioned.

The drain tubes 85, e.g., conduits, are typically about 2, 2½ or 3 inches (5 cm, 6.3 cm or 7.6 cm) in diameter and are substantially small in diameter than a conventional drain tube. The drain tubes 85 are arranged in a conical array such that each tube extends from its corresponding filtrate inlet 86 to an annular tube sheet 92 at one end of the filtrate chamber. The tubes may be arranged in a symmetrical radial array about the axis of the drum.

The tube sheet 92 defines one end of the filtrate chamber 28. The tube sheet is attached to the drum and includes an outlet apertures for each of the drain tubes. The apertures are arranged annularly to correspond to the annular arrangement of the drain tubes 85. The apertures in the tube sheet for each drain tube is at an angular position corresponding to the angular position of the inlet 86 to the tube. Filtrate flowing through the drain tubes discharges through the tube sheet into the filtrate chamber 28. Filtrate also flows into the end drain 82 from the outer edge of the cylinder and at the discharge of the gap between the screening surface 93 and the support surface 94. The end drain comprises an annular array of radial channels 20 (FIG. 2) each separated by a radial dam 21 (FIG. 2) extending substantially from the drum axis to the cylindrical support surface 94.

The filtrate chamber 28 has a bottom semi-cylindrical wall 88 to direct filtrate into the trunnion conduit 34 and to prevent filtrate from flowing into the vat.

The filtrate flows from the filtrate chamber, through the trunnion conduit and elbow 30 and down into the down leg 32. The downward flow of the filtrate creates a suction in the end drain, drain tubes and in the filtrate channels. The suction draws the pulp slurry onto the screening surface while the drum surface is in the pulp slurry vat and draws water and cooking liquor through the pulp mat as the drum surface is raised and subjected to the water spray wash. Suction is not applied to the ribs and tube as they rotate from about the 1:00 position to about the 5:00 position which is while there is no water spray (and thus a lack of liquid to support a continual flow of filtrate through the channels 18) and while the pulp mat is removed from the cylinder surface. A valve seal in the filtrate chamber stops suction.

Figure 5:
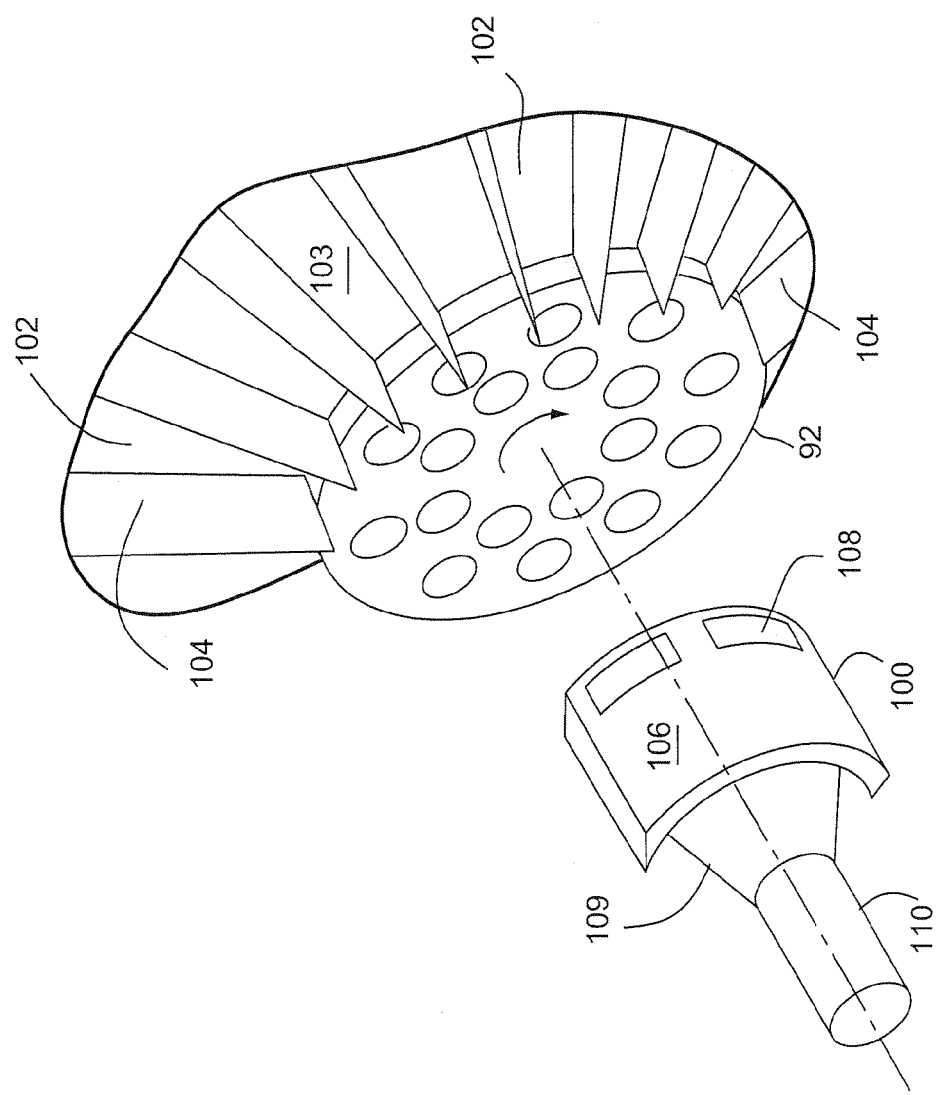
FIG. 5 is a perspective view of the valve seat and tube sheet of the vacuum washer drum shown in FIG. 4.

FIG. 5 is an exploded view of a valve seal 100, a tube sheet 92 and radial channels 102 (which are show exposed but would in practice be confined between opposite walls of the end drain). One wall 103 of the end drain is in the same plane as the tube sheet 92 and an opposite wall (not shown) is forward of the tube sheet. The channels walls 104 between the drain channels, e.g., ribs, have a radial inner edge near the perimeter of the tube sheet.

To block the suction as the drum rotates from the 1:00 to 5:00 positions, a valve seal 100 is applied to the outlet ends of the radial channels 102 of the end drain as the channels pass from the 1:00 position to the 5:00 position. The valve seal includes a curved plate 106 that is positioned adjacent the outlet of the radial channels 102. The valve seal plate 106 may include an aperture(s) 108 that allow gases and filtrate in the end drain channels 102 to drain as the channels pass over the plate. The aperture 108 is an inlet to a gas and filtrate drain that extends through the valve seal and through a support shaft 110. The plate may be doubled-walled to provide a closed passage for the aperture or include a pipe behind the plate that directs gas and foam into the shaft 110.

The valve seal also includes a pie-shaped plate 109 that faces and is adjacent the tube sheet 92. The pie-shaped plate blocks the outlets to the drain tubes as the tubes pass from the 1:00 to 5:00 positions. The pie-shaped plate may include aperture(s) to allow foam and gas from the drain tubes (as they pass from 1:00 to 5:00) to discharge into the valve and into the shaft 110. The pie-shaped plate may be doubled-wall to provide a closed passage for foam or gas or have a pipe behind the plate for foam and gas to flow to the shaft 110.

The valve seal is stationary and is supported by the shaft 110 extending from the elbow conduit 30 (FIG. 4) and through the trunnion conduit. The support shaft is hollow to allow gas and filtrate from the drain tubes and end drain channels to exhaust from the drum without being drawn into the filtrate flowing down into the down leg 32. The support shaft may be offset from the rotational axis of the drum and positioned down below the axis to facilitate the drainage of gases and foam from the drain tubes and end drain channels.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

I claim:

1. A vacuum drum washer comprising:
a cylindrical drum including a screen and deck defining an exterior cylindrical surface;
   a plurality of outer filtrate channels disposed inward of the screen, the outer filtrate channels extending along a longitudinal axis of the drum and substantially an entire length of the drum;
   an array of filtrate radial drain channels extending radially inward along a first end of the drum from the outer filtrate channels towards a rotational axis of the drum;
   a filtrate chamber at the first end of the drum and receiving filtrate discharged from the filtrate radial drain channels, and
   a conical array of radial filtrate drainage conduits coupled to receive filtrate from the filtrate channels, the drainage conduits each having an inlet proximate to the filtrate channels, the inlets are arranged radially around the drum and positioned between a longitudinal center of the drum and a second end of the drum, and the radial drainage conduits direct filtrate to the filtrate chamber.

2. A vacuum drum washer as in claim 1 further comprising an annular filtrate drain channel adjacent the outer filtrate channels and draining filtrate from the channels to the radial filtrate drainage conduits, wherein the annular filtrate drain is positioned between a drum center and the second end of the drum.

3. A vacuum drum washer as in claim 2 wherein the annular filtrate drain is positioned within a distance of the second drum end no greater than a third of the drum length.

4. A vacuum drum washer as in claim 2 wherein the annular filtrate drain is positioned at least four feet from the second end of the drum.

5. A vacuum drum washer as in claim 1 the drain conduits have an inside diameter of no greater than three inches.

6. A vacuum drum washer as in claim 1 further comprising a tube sheet having apertures coupled to outlets to the filtrate drainage conduits, and said tube sheet defines a wall of the filtrate chamber.

7. A vacuum drum washer as in claim 6 wherein the tube sheet is in a plane with a backside wall of the annular filtrate drain.

8. A vacuum drum washer as in claim 1 further comprising a stationary valve seal blocking outlets to the drainage conduits and annular filtrate drains during a portion of a rotation of the tubes and drains.

9. A vacuum drum washer as in claim 1 wherein the array of radial filtrate drainage conduits is a conical array of tubes arranged symmetrically around the axis of the drum.

10. A vacuum drum washer comprising:
   a cylindrical drum including a screen and deck defining a cylindrical surface of the drum;
   filtrate longitudinal channels disposed below the screen and deck;
   an array of filtrate drainage radial channels at a first end of the drum and extending radially inward from the filtrate longitudinal channels along the first end of the drum;
   a filtrate chamber at the first end of the drum in fluid communication with the radial channels;
   a filtrate annular drain adjacent the outer filtrate channels and draining filtrate from the channels to the radial filtrate drainage conduits, wherein the annular filtrate drain is positioned between a drum center and the second end of the drum, and
   a conical array of filtrate drainage conduits disposed in the interior of the drum, the conduits having inlets proximate to the annular filtrate drain to receive filtrate and outlets in fluid communication with the filtrate chamber.

11. A vacuum drum washer as in claim 10 wherein filtrate annular drain is positioned within a distance of the drum end no greater than a third of the drum length.

12. A vacuum drum washer as in claim 10 wherein the filtrate annular drain is positioned at least four feet from an end of the drum.

13. A vacuum drum washer as in claim 10 the drain conduits have an inside diameter of no greater than three inches.

14. A vacuum drum washer as in claim 10 further comprising a tube sheet having apertures coupled to outlets to the drain conduits, and said tube sheet defines a wall of the filtrate chamber.

15. A vacuum drum washer as in claim 10 further comprising a stationary valve seal blocking outlets to the drainage conduits and filtrate annular channels during a portion of a rotation of the tubes and drains.

\* \* \* \* \*